(12) United States Patent
Horiuchi et al.

(10) Patent No.: US 8,224,238 B2
(45) Date of Patent: Jul. 17, 2012

(54) RADIO COMMUNICATION METHOD, RELAY STATION DEVICE, AND RADIO RECEIVER DEVICE

(75) Inventors: Ayako Horiuchi, Kanagawa (JP);
Kenichi Kuri, Kanagawa (JP); Kenichi Miyoshi, Kanagawa (JP); Akihiko Nishio, Kanagawa (JP); Tomohiro Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/046,376

(22) Filed: Mar. 11, 2011

(65) Prior Publication Data

US 2011/0165835 A1 Jul. 7, 2011

Related U.S. Application Data

(63) Continuation of application No. 11/816,824, filed as application No. PCT/JP2006/302964 on Feb. 20, 2006, now Pat. No. 7,929,988.

(30) Foreign Application Priority Data

Feb. 22, 2005 (JP) ................. 2005-045974

(51) Int. Cl.
*H04B 7/15* (2006.01)
(52) U.S. Cl. ......... 455/11.1; 455/13.1; 455/16; 370/315
(58) Field of Classification Search .......... 455/11.1, 455/13.1, 16; 370/315
See application file for complete search history.

(56) References Cited

U.S. PATENT DOCUMENTS

| | | | |
|---|---|---|---|
| 6,785,511 B1 * | 8/2004 | Hengeveld et al. | 455/16 |
| 7,577,399 B2 | 8/2009 | Eichinger | |
| 2001/0018328 A1 | 8/2001 | Ohkura | |
| 2003/0045230 A1 * | 3/2003 | Weissman | 455/11.1 |
| 2003/0124976 A1 | 7/2003 | Tamaki | |

(Continued)

FOREIGN PATENT DOCUMENTS

JP 62230244 10/1987

(Continued)

OTHER PUBLICATIONS

T. Miyano, et al. "Cooperative Relaying Technique with Space Time Block Code for Multihop Communications among Single Antenna Terminals," RCS2003-365, pp. 71-77, Mar. 2004, p. 2, Lines 13-15.

(Continued)

*Primary Examiner* — Danh Le
(74) *Attorney, Agent, or Firm* — Dickinson Wright PLLC

(57) ABSTRACT

Provided is a radio communication method or the like for making compatible an improvement in error rate characteristics and a reduction in delay. The radio communication method is used in a mobile communication system including a mobile station, a relay station and a base station. A transmitted signal containing a signal addressed to the base station is transmitted at first from the mobile station to the relay station. A non-reproduced relay signal obtained in the relay station from the transmitted signal is transmitted from the relay station to the base station. On the basis of the reception result of the non-reproduced relay signal at the base station, a re-transmission request of the transmitted signal is transmitted from the base station. A reproduced relay signal, as obtained from the transmitted signal in the relay station, is transmitted from the relay station to the base station in accordance with the re-transmission request transmitted from the base station.

11 Claims, 16 Drawing Sheets

U.S. PATENT DOCUMENTS

2005/0157696 A1   7/2005  Yamamoto
2005/0221755 A1*  10/2005 Falconer et al. ............. 455/11.1
2005/0229071 A1   10/2005 Uga

FOREIGN PATENT DOCUMENTS

| JP | 07273707 | 10/1995 |
| JP | 2001/244864 | 9/2001 |
| JP | 2003/198442 | 7/2003 |

OTHER PUBLICATIONS

PCT International Search Report dated Mar. 29, 2006.

* cited by examiner

RADIO COMMUNICATION METHOD, RELAY STATION DEVICE, AND RADIO RECEIVER DEVICE

This is a continuation application of application Ser. No. 11/816,824 filed Aug. 21, 2007, which is a national stage of PCT/JP2006/302964 filed Feb. 20, 2006, which is based on Japanese Application No. 2005-045974 filed Feb. 22, 2005, the entire contents of each which are incorporated by reference herein.

TECHNICAL FIELD

The present invention relates to a radio communication method, a relay station apparatus and a radio receiving apparatus used in a radio communication system that relays a transmission signal.

BACKGROUND ART

In recent years, studies are being actively conducted on technical approaches to realize a high transmission rate using a high frequency radio band in a cellular mobile communication system represented by, for example, a cellular phone set. When a high frequency radio band is used, attenuation due to a transmission distance increases, compared with the case of using a low frequency radio band so that the area where the realization of a high transmission rate can be expected is limited to a relatively short distance area. Therefore, more base station apparatuses need to be installed in the system. The cost is commensurate with installing base stations and there is a strong demand for realization of a high transmission rate in restraining the increase in the number of base station apparatuses.

For example, Non-Patent Document 1 gives two types of relay systems as a technique responding to this demand. Here, the relay system means a communication system to relay a transmission signal. Non-Patent Document 1 evaluates a decode and forward system whereby a transmission signal is decoded once at a relay station apparatus that executes relaying and an amplify and forward system whereby a transmission signal is not decoded at a relay station apparatus from the standpoint of an error rate characteristic. It is proven that the decode and forward system has a gain of 2 dB over the amplify and forward system in a flat Rayleigh fading model.
Non-Patent Document 1: "Cooperative Relaying Technique with Space Time Block Code for Multihop Communications among Single Antenna Terminals", RCS2003-365

DISCLOSURE OF INVENTION

Problems to be Solved by the Invention

However, when the amplify and forward system and the decode and forward system are evaluated from the standpoint of the amount of delay, the decode and forward system has a greater amount of delay than the amplify and forward system by an amount corresponding to decode of a transmission signal. That is, as for the relay system, there is a tradeoff between an error rate characteristic and the amount of delay. More specifically, when the decode and forward system is used as the relay system for all the relay station apparatuses in the system, the error rate characteristic in the system as a whole improves, whereas the amount of delay increases. On the other hand, when the amplify and forward system is used as the relay system for all the relay station apparatuses in the system, the amount of delay in the system decreases as a whole, whereas the error rate characteristic degrades.

It is an object of the present invention to provide a radio communication method, a relay station apparatus and a radio receiving apparatus that are capable of improving an error rate characteristic and reducing the amount of delay.

Means for Solving the Problem

The radio communication method of the present invention is used in a radio communication system having a radio transmitting apparatus, a relay station apparatus and a radio receiving apparatus, and includes: a transmission step of transmitting a transmission signal from the radio transmitting apparatus to the relay station apparatus; a first relay step of transmitting an amplify and forward relay signal obtained from the transmission signal transmitted in the transmission step, from the relay station apparatus to the radio receiving apparatus; a requesting step of transmitting a retransmission request of the transmission signal from the radio receiving apparatus based on a reception result of the amplify and forward relay signal transmitted in the first relay step at the radio receiving apparatus; and a second relay step of transmitting the decode and forward relay signal obtained from the transmission signal transmitted in the transmission step from the relay station apparatus to the radio receiving apparatus according to the retransmission request transmitted in the requesting step.

The relay station apparatus of the present invention relays a signal transmitted from a radio transmitting apparatus and employs a configuration having: a receiving section that receives a signal for a radio receiving apparatus transmitted from the radio transmitting apparatus; a generating section that generates an amplify and forward relay signal and a decode and forward relay signal from the received signal for the radio receiving apparatus; and a transmitting section that transmits an amplify and forward relay signal upon relaying the signal for the radio receiving apparatus for the first time and that transmits a decode and forward relay signal upon re-relaying the signal for the radio receiving apparatus according to a retransmission request transmitted from the radio receiving apparatus.

The radio receiving apparatus of the present invention employs a configuration having: a receiving section that receives an amplify and forward relay signal obtained from a transmission signal transmitted from a radio transmitting apparatus and transmitted from a first relay station apparatus and a decode and forward relay signal obtained from the transmission signal transmitted from the radio transmitting apparatus and transmitted from a second relay station apparatus; a deciding section that decides whether or not there is a necessity of a retransmission of an amplify and forward relay signal with a transmission of a decode and forward relay signal executed based on the reception result of the amplify and forward relay signal in the receiving section; and a transmitting section that transmits a first retransmission request that executes a transmission of a decode and forward relay signal and a retransmission of an amplify and forward relay signal when a retransmission of an amplify and forward relay signal is decided to be necessary, and that transmits a second retransmission request that executes a transmission of only the decode and forward relay signal when a retransmission of an amplify and forward relay signal is decided to be unnecessary.

Advantageous Effect of the Invention

According to the present invention, it is possible to improve an error rate characteristic and reduce the amount of delay.

BEST MODE FOR CARRYING OUT THE INVENTION

Hereinafter, embodiments of the present invention will be explained in detail with reference to the attached drawings.

(Embodiment 1)

Figure 1:
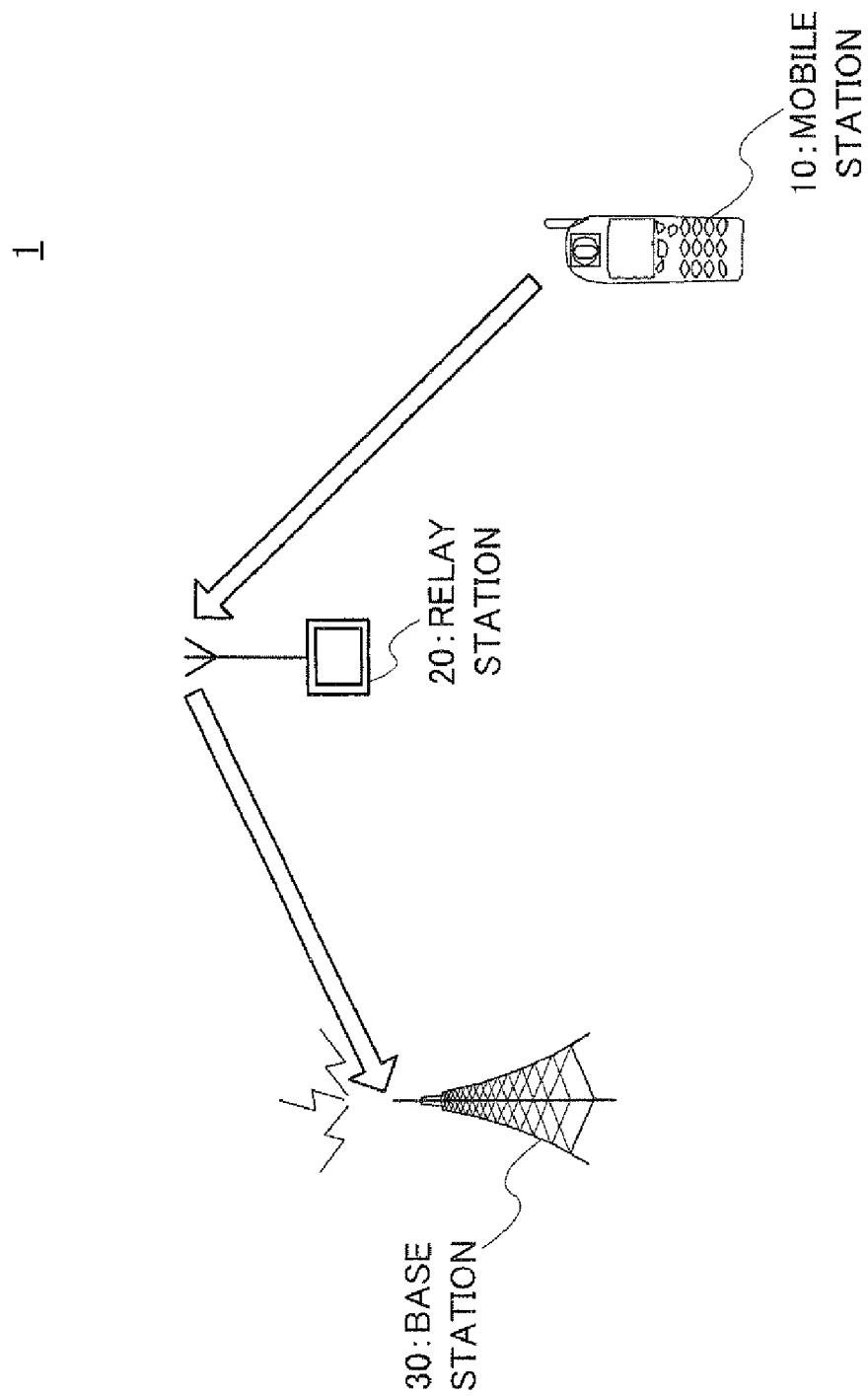
FIG. 1 illustrates the configuration of a mobile communication system according to Embodiment 1 of the present invention.

FIG. 1 shows the configuration of a mobile communication system according to Embodiment 1 of the present invention. Mobile communication system 1 in FIG. 1 has mobile station apparatus (hereinafter a "mobile station") 10, relay station apparatus (hereinafter a "relay station") 20 and base station apparatus (hereinafter a "base station") 30. Mobile station 10, relay station 20 and base station 30 execute transmission/reception in frame units having a predetermined time length.

In mobile communication system 1, mobile station 10 transmits a data signal for base station 30 to relay station 20. Relay station 20 executes relay processing to relay the data signal for base station 30 transmitted from mobile station 10. In other words, relay station 20 receives the data signal transmitted from mobile station 10 and transmits the received data signal to base station 30. Base station 30 receives the relay signal transmitted from relay station 20. Furthermore, upon detecting an error in the received relay signal, base station 30 transmits a retransmission request signal for a retransmission of the data signal.

Figure 2:
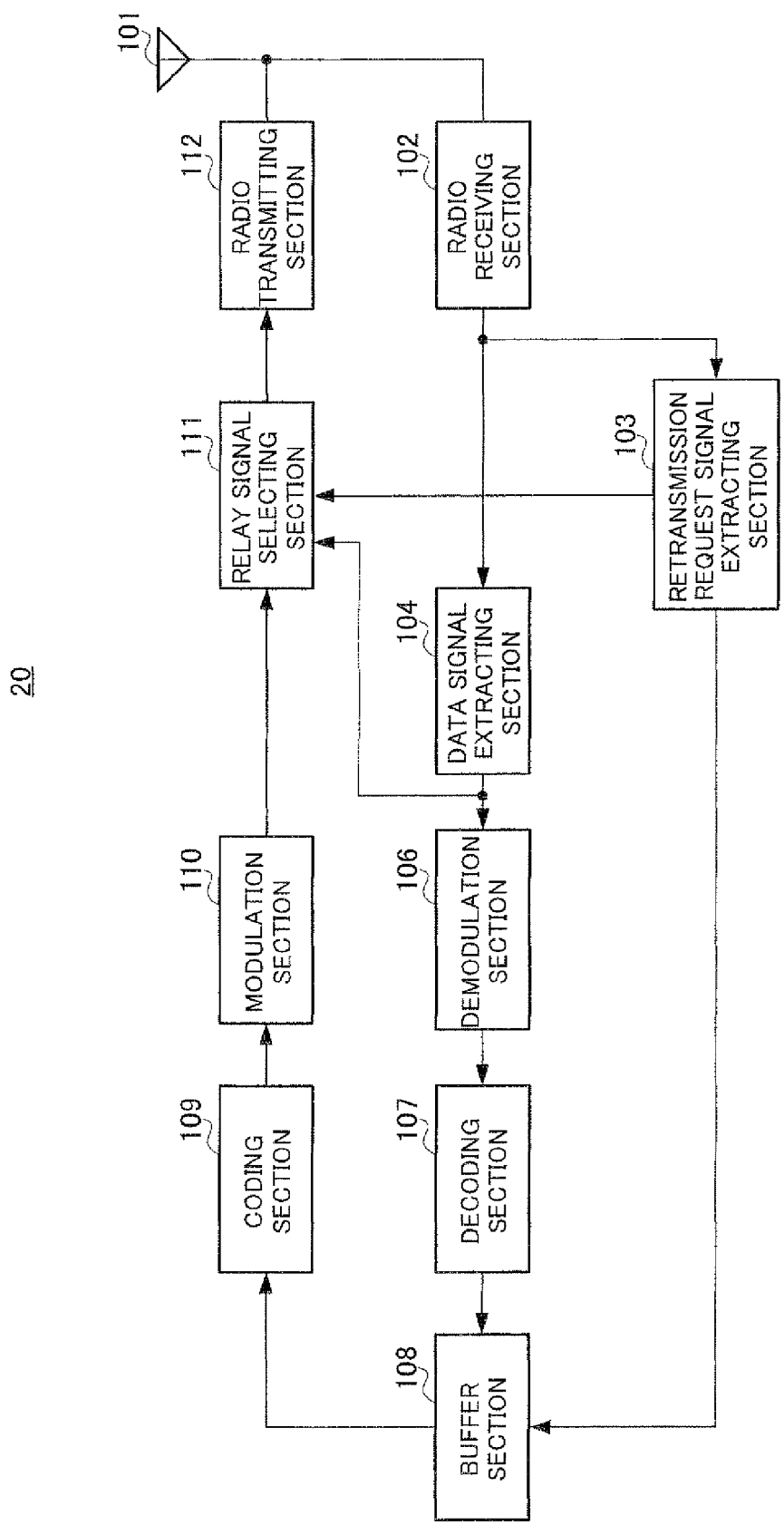
FIG. 2 is a block diagram showing the configuration of a relay station apparatus according to Embodiment 1 of the present invention.

FIG. 2 is a block diagram showing the configuration of relay station 20. Relay station 20 has antenna 101, radio receiving section 102, retransmission request signal extracting section 103, data signal extracting section 104, demodulation section 106, decoding section 107, buffer section 108, coding section 109, modulation section 110, relay signal selecting section 111 and radio transmitting section 112.

Radio receiving section 102 receives a radio signal through antenna 101. The received radio signal includes a data signal for base station 30 transmitted from mobile station 10 and a retransmission request signal (NACK: Negative Acknowledgement) transmitted from base station 30. Radio receiving section 102 applies predetermined reception radio processing (e.g., down-conversion or A/D conversion) to the received radio signal and obtains a baseband signal.

Retransmission request signal extracting section 103 extracts a retransmission request signal from the baseband signal. The extracted retransmission request signal is outputted to relay signal selecting section 111 and buffer section 108.

Data signal extracting section 104 extracts a data signal from the baseband signal. The extracted data signal is outputted to demodulation section 106 and relay signal selecting section 111.

Demodulation section 106 demodulates the data signal inputted from data signal extracting section 104. Decoding section 107 applies error correcting decode to the data signal demodulated by demodulation section 106. The data signal decoded by decoding section 107 is temporarily saved in buffer section 108.

Buffer section 108 outputs the saved data signal to coding section 109 when a retransmission request signal that requests a retransmission of the saved data signal is inputted from retransmission request signal extracting section 103.

In the present embodiment, buffer section 108 is provided between decoding section 107 and coding section 109, but the arrangement of buffer section 108 is not limited to the above described one. Buffer section 108 may also be provided after modulation section 110 to temporarily save the data signal modulated by modulation section 110. Buffer section 108 may also be provided after encoding section 109 to temporarily save the data signal encoded by coding section 109. Buffer section 108 may also be provided after demodulation section 106 to temporarily save the data signal demodulated by demodulation section 106. Moreover, buffer section 108 may also be provided after data signal extracting section 104 to temporarily save the data signal extracted by data signal extracting section 104. Furthermore, a plurality of buffer sections 108 may also be provided at a plurality of locations of the above described arrangement.

When a data signal is inputted from buffer section 108, coding section 109 applies error correcting coding to the data signal. Modulation section 110 modulates the data signal encoded by coding section 109.

When no retransmission request signal requesting a retransmission of the data signal is inputted from retransmission request signal extracting section 103, relay signal selecting section 111 selects the data signal inputted from data signal extracting section 104 out of the data signal inputted from data signal extracting section 104 and the data signal inputted from modulation section 110. The data signal inputted from data signal extracting section 104 is relayed without being decoded once at relay station 20. Therefore, in the following explanation, this signal will be referred to as an "amplify and forward relay signal". "Decoded once" means that a signal is processed by demodulation section 106, decoding section 107, coding section 109 and modulation section 110.

Furthermore, when a retransmission request signal requesting a retransmission of the data signal is inputted from retransmission request signal extracting section 103, relay signal selecting section 111 selects the data signal inputted from modulation section 110 out of the data signal inputted from data signal extracting section 104 and the data signal inputted from modulation section 110. The data signal inputted from modulation section 110 is decoded once at relay station 20 and relayed. Therefore, in the following explanation, this signal will be referred to as a "decode and forward relay signal". Furthermore, the "relay signal" refers to either one or both of the "amplify and forward relay signal" and the "relay signal".

Radio transmitting section 112 applies predetermined radio transmission processing (e.g., D/A conversion, up-conversion and amplification) to the amplify and forward relay signal or the decode and forward relay signal selected by relay signal selecting section 111. The signal after the radio transmission processing is then transmitted from antenna 101 to base station 30.

Figure 3:
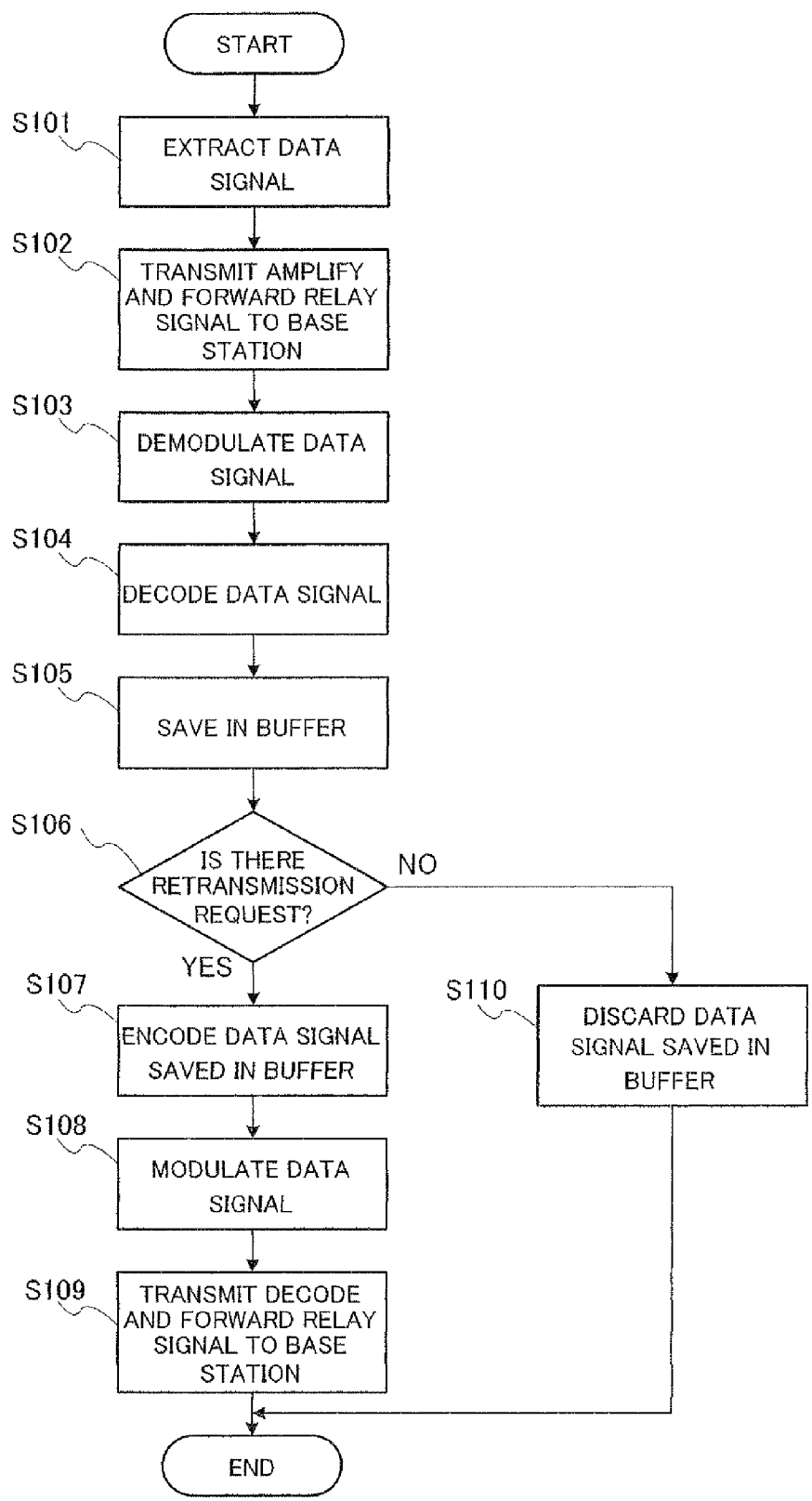
FIG. 3 is a flow chart illustrating an example of operation of the relay station apparatus according to Embodiment 1 of the present invention.

Next, a relay signal selecting operation at relay station 20 according to a retransmission request will be explained. FIG. 3 is a flow chart illustrating an example of the relay signal selecting operation at relay station 20 according to a retransmission request.

First, in relay station 20, data signal extracting section 104 extracts a data signal from a baseband signal (step S101). The extracted data signal is inputted to demodulation section 106 and relay signal selecting section 111. Relay signal selecting section 111 selects the data signal inputted from data signal extracting section 104. The selected data signal is an amplify and forward relay signal. Radio transmitting section 112 transmits the selected amplify and forward relay signal to base station 30 (step S102).

Relay signal selecting section 111 may also be adapted to select the data signal inputted from data signal extracting section 104 only when the data signal is transmitted for the first time.

Furthermore, demodulation section 106 demodulates the data signal inputted from data signal extracting section 104 (step S103) and decoding section 107 decodes the demodulated data signal (step S104). The decoded data signal is saved in buffer section 108 (step S105).

Here, whether or not there is a retransmission request is decided (step S106). This decision is made after confirming whether a retransmission request signal is inputted to relay signal selecting section 111 from retransmission request signal extracting section 103. When there is a retransmission request (S106: YES), the relay is a re-relay, that is, the data signal is retransmitted. In this case, coding section 109 encodes the data signal saved in buffer section 108 (step S107), modulation section 110 modulates the encoded data signal (step S108) and relay signal selecting section 111 selects the data signal inputted from modulation section 110. The selected data signal is a decode and forward relay signal. Radio transmitting section 112 transmits (retransmits) the selected decode and forward relay signal to base station 30 (step S109). When there is no retransmission request (S106: NO), no data signal is retransmitted and the data signal saved in buffer section 108 is discarded (step S110).

Figure 4:
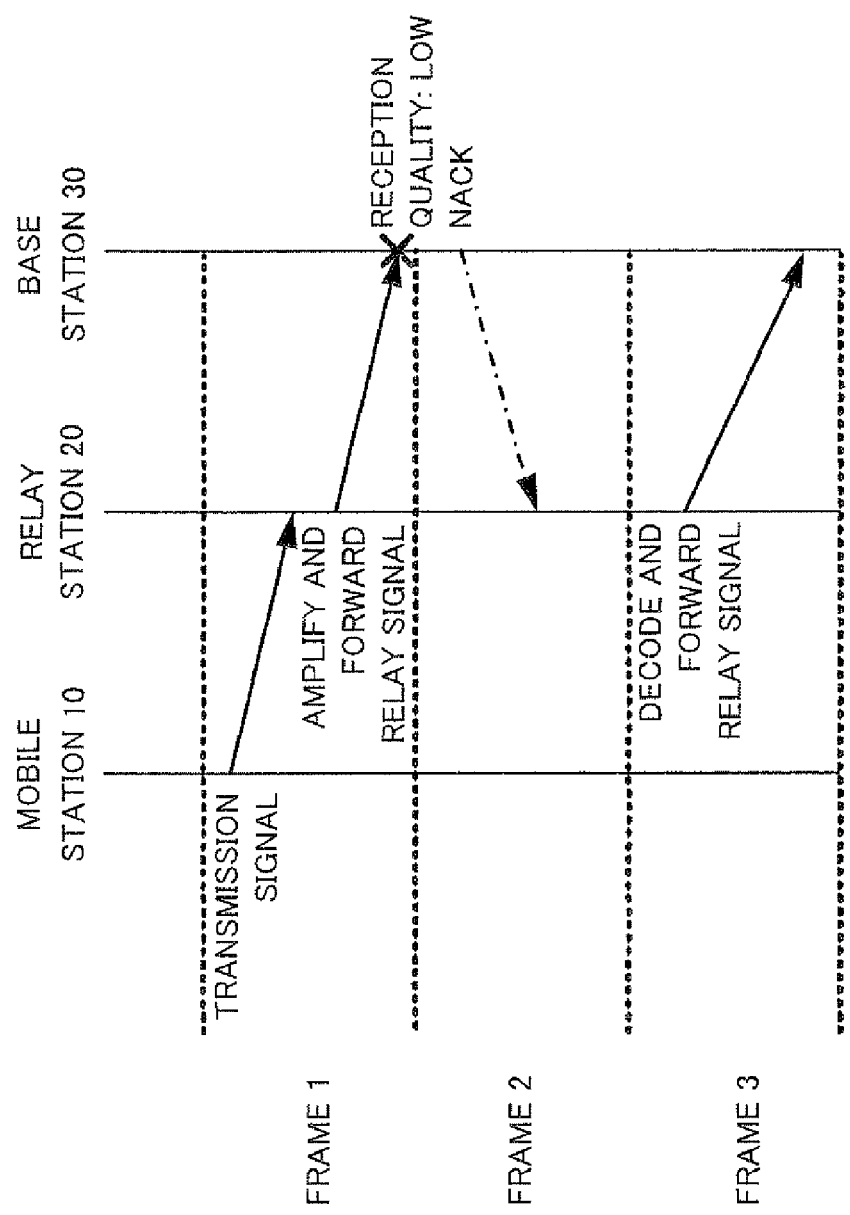
FIG. 4 illustrates an example of operation of the mobile communication system according to Embodiment 1 of the present invention.

Next, the operation of the whole system according to a retransmission control will be explained with the example shown in FIG. 4.

First, in frame 1, mobile station 10 transmits a data signal (transmission signal) to relay station 20. Relay station 20 transmits an amplify and forward relay signal obtained from the transmission signal to base station 30. The generation of an amplify and forward relay signal is not accompanied by any delay made by decode processing and the amplify and forward relay signal is transmitted in frame 1.

Base station 30 decides whether there is an error in the received amplify and forward relay signal. As a result of the decision, when an error is detected and the reception quality is decided to be low, a retransmission request signal (NACK) is transmitted from base station 30 to relay station 20 in frame 2.

Relay station 20 that received the retransmission request signal (NACK) transmits a decode and forward relay signal obtained from the transmission signal to base station 30 in frame 3.

In this way, according to the present embodiment, relay station 20 has relay functions based on a decode and forward system and an amplify and forward system. Relay station 20 relays a data signal while switching between the amplify and forward system and the decode and forward system. More specifically, the relay system is decided depending on whether the relay is a first-time relay or a re-relay. In the case of a first-time relay, relay station 20 executes a relay based on the amplify and forward system, and in case of a re-relay, relay station 20 executes a relay based on the decode and forward system. In this way, the delay of the first-time relay can be reduced and the reception quality of the re-relay can be improved. That is, it is possible to improve an error rate characteristic and reduce the amount of delay by utilizing advantages of the amplify and forward system and the decode and forward system in a mutually complementary manner, so that it is possible to improve the throughput of the whole system.

In the present embodiment, it is possible to realize the above described operations and effects on an uplink data transmission by using mobile station 10 as the radio transmitting apparatus and base station 30 as the radio receiving apparatus. Moreover, it is also possible to realize the above described operations and effects on a downlink data transmission by using base station 30 as the radio transmitting apparatus and mobile station 10 as the radio receiving apparatus.

Furthermore, relay station 20 explained in the present embodiment may be a dedicated relay apparatus installed at a predetermined location or in a movable manner or may also be provided inside a base station or a mobile station.

(Embodiment 2)

Figure 5:
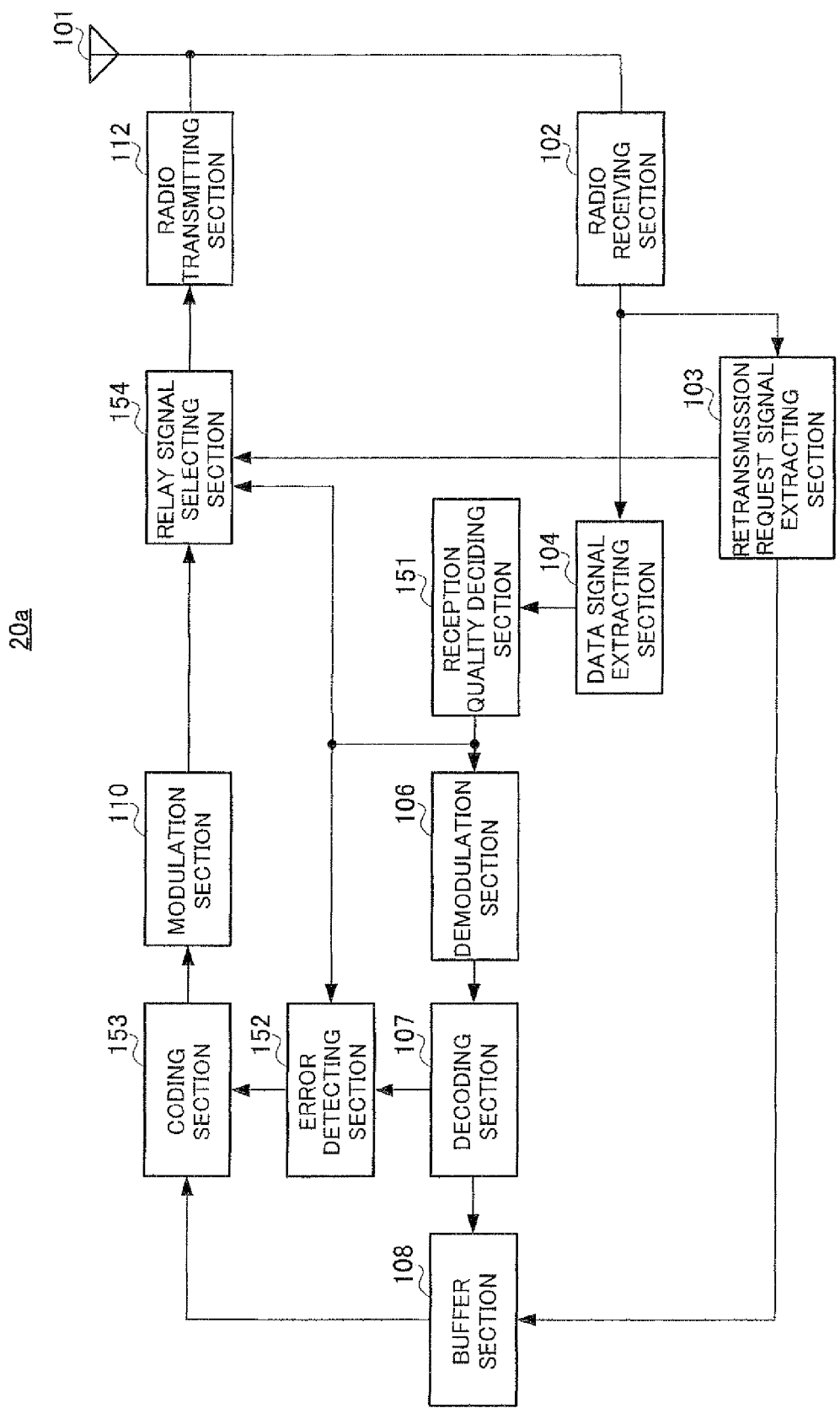
FIG. 5 is a block diagram showing the configuration of a relay station apparatus according to Embodiment 2 of the present invention.

FIG. 5 is a block diagram showing the configuration of a relay station according to Embodiment 2 of the present invention. Relay station 20*a* in FIG. 5 has a basic configuration similar to that of relay station 20 explained in Embodiment 1, the same components as those explained in Embodiment 1 are assigned the same reference numerals and detailed explanations thereof will be omitted. In mobile communication system 1 explained in Embodiment 1, relay station 20*a* can be used as a substitute for relay station 20.

Relay station 20*a* has reception quality deciding section 151 and error detecting section 152 in addition to the components of relay station 20. Furthermore, relay station 20*a* also has coding section 153 and relay signal selecting section 154 instead of coding section 109 and relay signal selecting section 111 provided for relay station 20.

Reception quality deciding section 151 decides the reception quality of a data signal extracted by data signal extracting section 104. More specifically, reception quality deciding section 151 measures the reception quality with a pilot signal (hereinafter a "pilot") added to the data signal at mobile station 10. Reception quality deciding section 151 outputs the data signal to demodulation section 106 and relay signal selecting section 154 and also outputs the decision result of the reception quality of the data signal to relay signal selecting section 154 and error detecting section 152.

Error detecting section 152 receives the reception quality decision result inputted from reception quality deciding section 151. When the reception quality decision result shows that the reception quality is equal to or below a predetermined value, error detecting section 152 applies error detection to the data signal decoded by decoding section 107. In the present embodiment, error detecting section 152 executes error detection using CRC (Cyclic Redundancy Check). Moreover, an available error detecting method is not limited to CRC and a vertical parity check, a horizontal parity check, or a Hamming code may also be used alternatively.

When an error is detected as a result of an error detection (CRC: NG), error detecting section 152 does not output any decoded data signal to coding section 153. On the other hand, when no error is detected as a result of an error detection (CRC: OK), error detecting section 152 outputs the decoded data signal to coding section 153.

When a data signal is inputted from buffer section 108, coding section 153 applies error correcting coding to the data signal. Furthermore, when a data signal is inputted from error detecting section 152, coding section 153 applies error correcting coding to the data signal.

When no retransmission request signal requesting a retransmission of a data signal is inputted from retransmission request signal extracting section 103 and the reception quality decision result inputted from reception quality deciding section 151 shows that the reception quality of the data signal is higher than a predetermined value, relay signal selecting section 154 selects the data signal inputted from reception quality deciding section 151 out of the data signal inputted from reception quality deciding section 151 and the data signal inputted from modulation section 110. The data signal inputted from reception quality deciding section 151 is transmitted as an amplify and forward relay signal without being decoded once at relay station 20*a*.

Furthermore, when no retransmission request signal requesting a retransmission of the data signal is inputted from retransmission request signal extracting section 103 and the reception quality decision result inputted from reception quality deciding section 151 shows that the reception quality of the data signal is equal to or below a predetermined value, relay signal selecting section 154 selects the data signal inputted from modulation section 110 out of the data signal inputted from reception quality deciding section 151 and modulation section 110. The data signal inputted from modulation section 110 is relayed after being decoded once at relay station 20*a*. That is, the data signal becomes a decode and forward relay signal.

Furthermore, when a retransmission request signal requesting a retransmission of the data signal is inputted from retransmission request signal extracting section 103, relay signal selecting section 154 selects the data signal inputted from modulation section 110, that is, a decode and forward relay signal.

Figure 6:
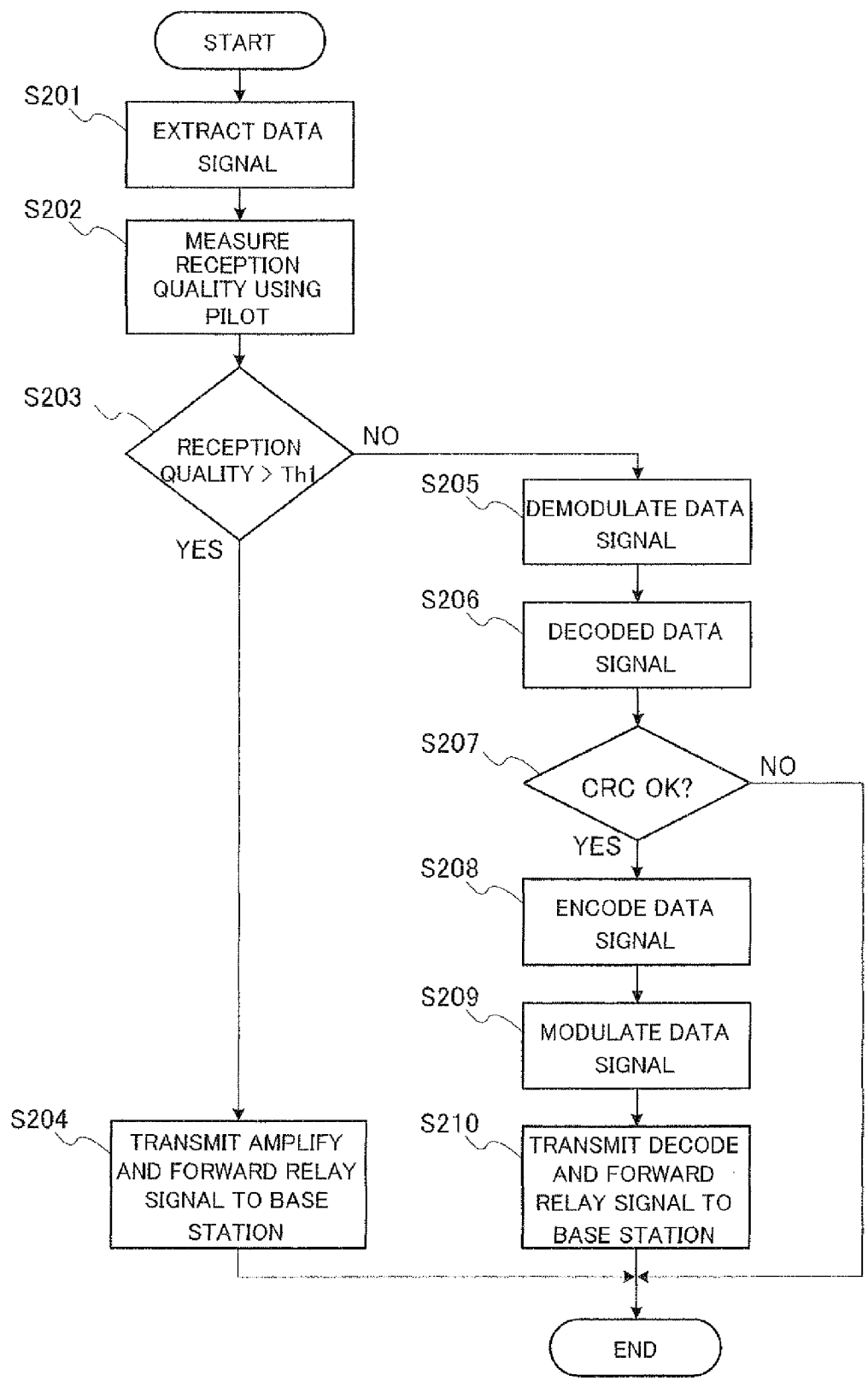
FIG. 6 is a flow chart illustrating another example of operation of the relay station apparatus according to Embodiment 2 of the present invention.

Next, a relay signal selecting operation at relay station 20*a* according to a decision on the reception quality of the data signal will be explained. FIG. 6 is a flow chart illustrating an example of the relay signal selecting operation of relay station 20*a* according to the reception quality decision of the data signal. Here, it is assumed that there is no retransmission request from base station 30.

First, in relay station 20*a*, data signal extracting section 104 extracts a data signal from a baseband signal (step S201). The extracted data signal is inputted to relay signal selecting section 154 and demodulation section 106 through reception quality deciding section 151.

Furthermore, reception quality deciding section 151 measures the reception quality of the data signal, using a pilot added to the extracted data signal (step S202). Reception quality deciding section 151 then compares the measured reception quality with predetermined threshold Th1 (step S203). When the reception quality is higher than threshold Th1 as a result of the comparison (S203: YES), relay signal selecting section 154 selects the data signal inputted from reception quality deciding section 151. The selected data signal is an amplify and forward relay signal. Radio transmitting section 112 transmits the selected amplify and forward relay signal to base station 30 (step S204).

On the other hand, when the reception quality is equal to or below threshold Th1 as a result of the comparison (S203: NO), demodulation section 106 demodulates the data signal inputted from reception quality deciding section 151 (step S205) and decoding section 107 decodes the demodulated data signal (step S206).

Then, error detecting section 152 executes a CRC check on the decoded data signal (step S207). When no error is detected as a result of the CRC check (S207: YES), coding section 153 decodes the data signal inputted from error detecting section 152 (step S208), modulation section 110 modulates the encoded data signal (step S209) and relay signal selecting section 154 selects the data signal inputted from modulation section 110. The selected data signal is a decode and forward relay signal. Radio transmitting section 112 transmits the selected decode and forward relay signal to base station 30 (step S210).

In this way, an amplify and forward relay signal is transmitted when the reception quality is higher than a predetermined level and a decode and forward relay signal is transmitted when the reception quality is equal to or below the predetermined level, so that it is possible to reduce a delay for a signal of high reception quality and suppress degradation of reception quality for a signal of low reception quality.

Furthermore, when an error is detected as a result of the CRC check (S207: NO), no relay signal is transmitted. In this way, when the reception quality is equal to or below a predetermined level and no error is detected, a decode and forward relay signal is transmitted, whereas when the reception quality is equal to or below the predetermined level and an error is detected, none of amplify and forward relay signal and decode and forward relay signal is transmitted, so that it is possible to prevent a relay signal containing an error from being transmitted.

Figure 7:
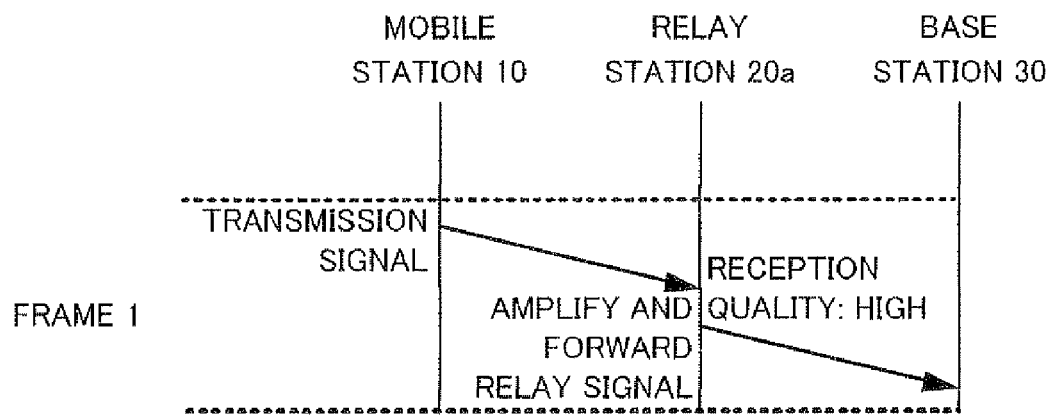
FIG. 7 illustrates another example of operation of the mobile communication system according to Embodiment 2 of the present invention.
Figure 8:
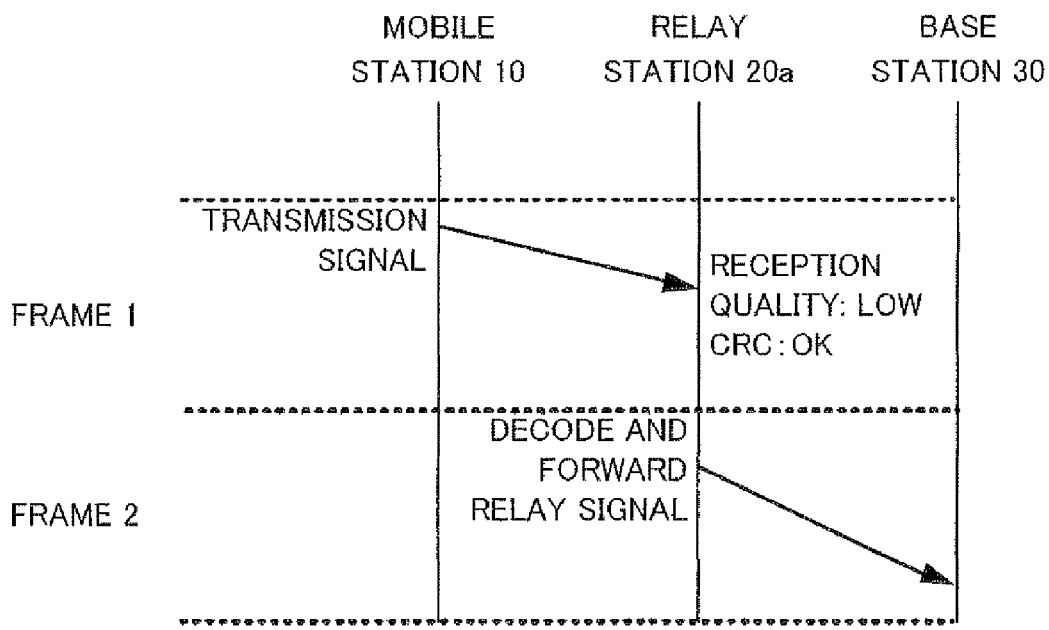
FIG. 8 illustrates a further example of operation of the mobile communication system according to Embodiment 2 of the present invention.

Next, the operation of the whole system related to a decision on the reception quality of a data signal will be explained with two examples shown in FIG. 7 and FIG. 8. FIG. 7 shows an example where the reception quality of a data signal is high and FIG. 8 shows an example where the reception quality of a data signal is low.

First, the example of FIG. 7 will be explained. In frame 1, mobile station 10 transmits a data signal (transmission signal) to relay station 20a. Relay station 20a decides the reception quality of the data signal. When the reception quality is higher than a predetermined value as a result of the decision, relay station 20a transmits an amplify and forward relay signal obtained from the transmission signal to base station 30.

Next, the example of FIG. 8 will be explained. In frame 1, mobile station 10 transmits a data signal (transmission signal) to relay station 20a. Relay station 20a decides the reception quality of the data signal. When the reception quality is proven to be equal to or below a predetermined value as a result of the decision, relay station 20a transmits the decode and forward relay signal obtained from the transmission signal to base station 30. A delay in the generation of a decode and forward relay signal is made by decode processing, so that the decode and forward relay signal is transmitted in frame 2. This example assumes that no error is detected in the decoded signal of the data signal as a result of a CRC check.

In this way, according to the present embodiment, relay station 20a has relay functions of a decode and forward system and an amplify and forward system. Relay station 20a relays a data signal while switching between the amplify and forward system and the decode and forward system. More specifically, the relay system is determined by the reception quality of the first relayed data signal. Relay station 20a executes a relay based on the amplify and forward system when the reception quality of the first relayed data signal is high and executes a relay based on the decode and forward system when the reception quality of the first relayed data signal is low. By doing so, it is possible to reduce the possibility that a retransmission request signal is transmitted from base station 30 and improve the reception quality of a re-relay when a decode and forward relay signal is transmitted for a data signal of low reception quality at the first time relay compared to the case where an amplify and forward relay signal is transmitted. That is, it is possible to introduce advantages of the amplify and forward system and the decode and forward system in a complementary manner, improve an error rate characteristic, and reduce the amount of delay, so that it is possible to improve the throughput in the whole system.

In the present embodiment, it is possible to realize the above described operations and effects on an uplink data transmission by using mobile station 10 as the radio transmitting apparatus and base station 30 as the radio receiving apparatus. Moreover, it is also possible to realize the above described operations and effects on a downlink data transmission by using base station 30 as the radio transmitting apparatus and mobile station 10 as the radio receiving apparatus.

Furthermore, relay station 20a explained in the present embodiment may be a dedicated relay apparatus installed at a predetermined location or in a movable manner, or may also be provided inside a base station or a mobile station.

(Embodiment 3)

Figure 9:
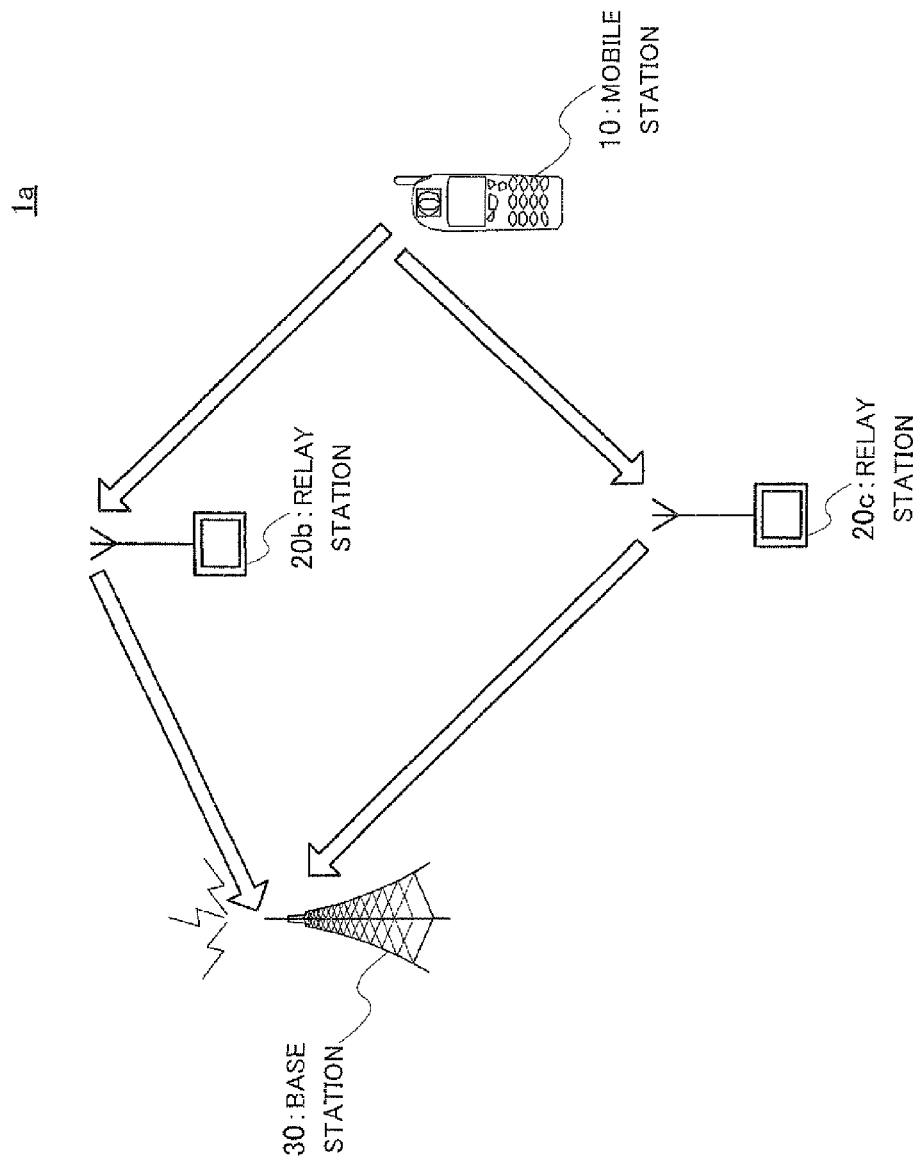
FIG. 9 shows the configuration of a mobile communication system according to Embodiment 3 of the present invention.

FIG. 9 illustrates the configuration of a mobile communication system according to Embodiment 3 of the present invention. Mobile communication system 1a in FIG. 9 has relay stations 20b and 20c in addition to mobile station 10 and base station 30 explained in Embodiment 1.

Relay station 20b includes a combination of, for example, antenna 101, radio receiving section 102, data signal extracting section 104 and radio transmitting section 112 explained in Embodiment 1 and has only the function based on an amplify and forward system. Relay station 20c has a configuration, which will be described later, and has only the function based on a decode and forward system. Therefore, relay station 20b generates an amplify and forward relay signal from a data signal transmitted from mobile station 10 and transmits the generated amplify and forward relay signal to base station 30. Relay station 20c generates a decode and forward relay signal from a data signal transmitted from mobile station 10 and transmits the generated decode and forward relay signal to base station 30. Base station 30 receives the relay signal transmitted from relay station 20b or relay station 20c. Furthermore, upon detecting an error in the received relay signal, base station 30 transmits a retransmission request signal to request a retransmission of the data signal.

Figure 10:
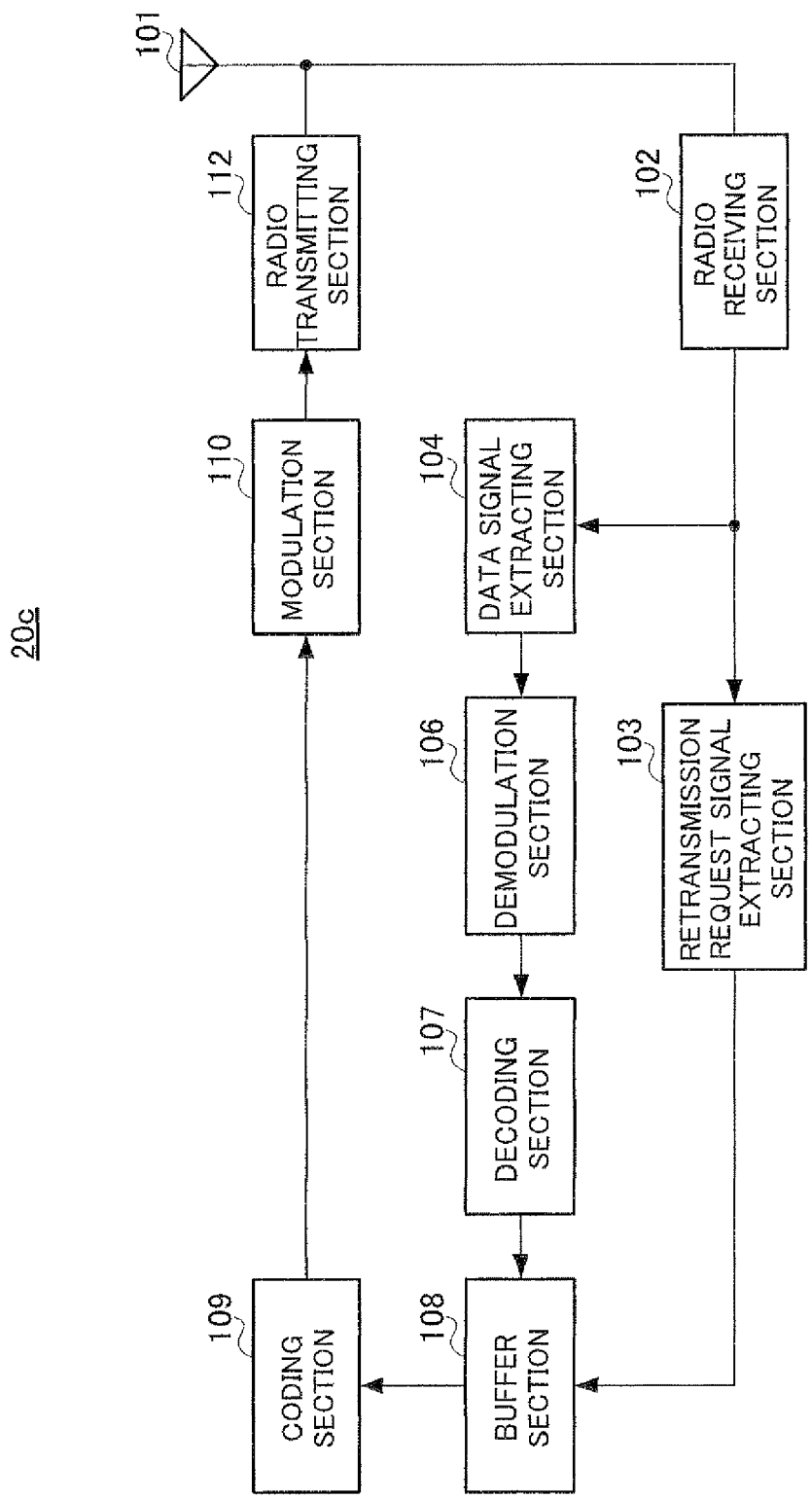
FIG. 10 is a block diagram showing the configuration of a relay station apparatus according to Embodiment 3 of the present invention.

FIG. 10 is a block diagram showing the configuration of relay station 20c. Since relay station 20c has a basic configuration similar to that of relay station 20 explained in Embodiment 1, the same components explained in Embodiment 1 are assigned the same reference numerals and detailed explanations thereof will be omitted.

Relay station 20c differs from relay station 20 in having no relay signal selecting section 111.

Figure 11:
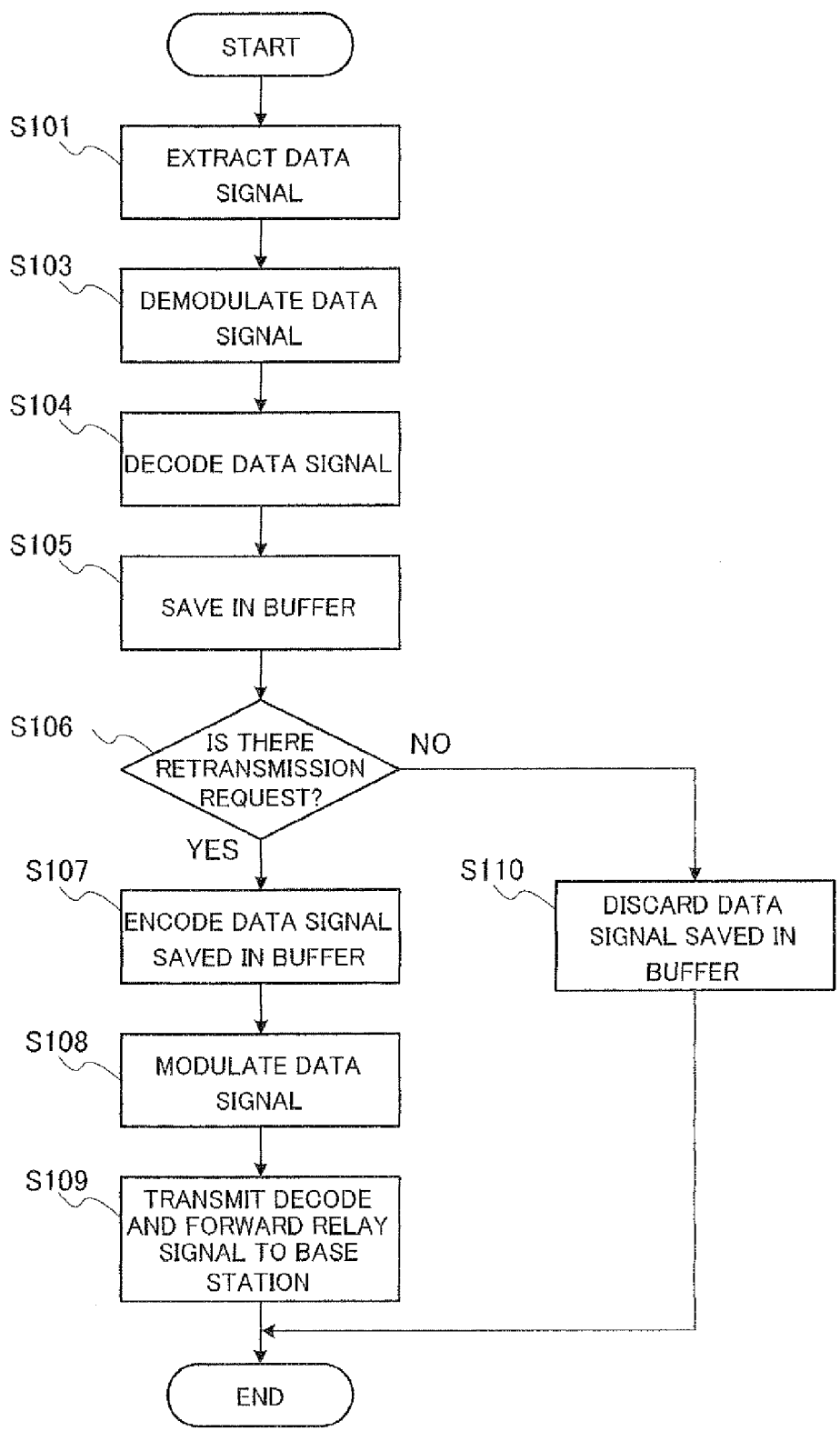
FIG. 11 is a flow chart illustrating an example of operation of the relay station apparatus according to Embodiment 3 of the present invention.

Next, an operation of relay station 20c having the above described configuration will be explained. FIG. 11 is a flow chart illustrating an example of operation of relay station 20c.

The operation example shown in FIG. 11 is similar to the operation example explained in FIG. 3, but differs from the operation example in FIG. 3 only in that the processing in step S102 is not executed.

Figure 12:
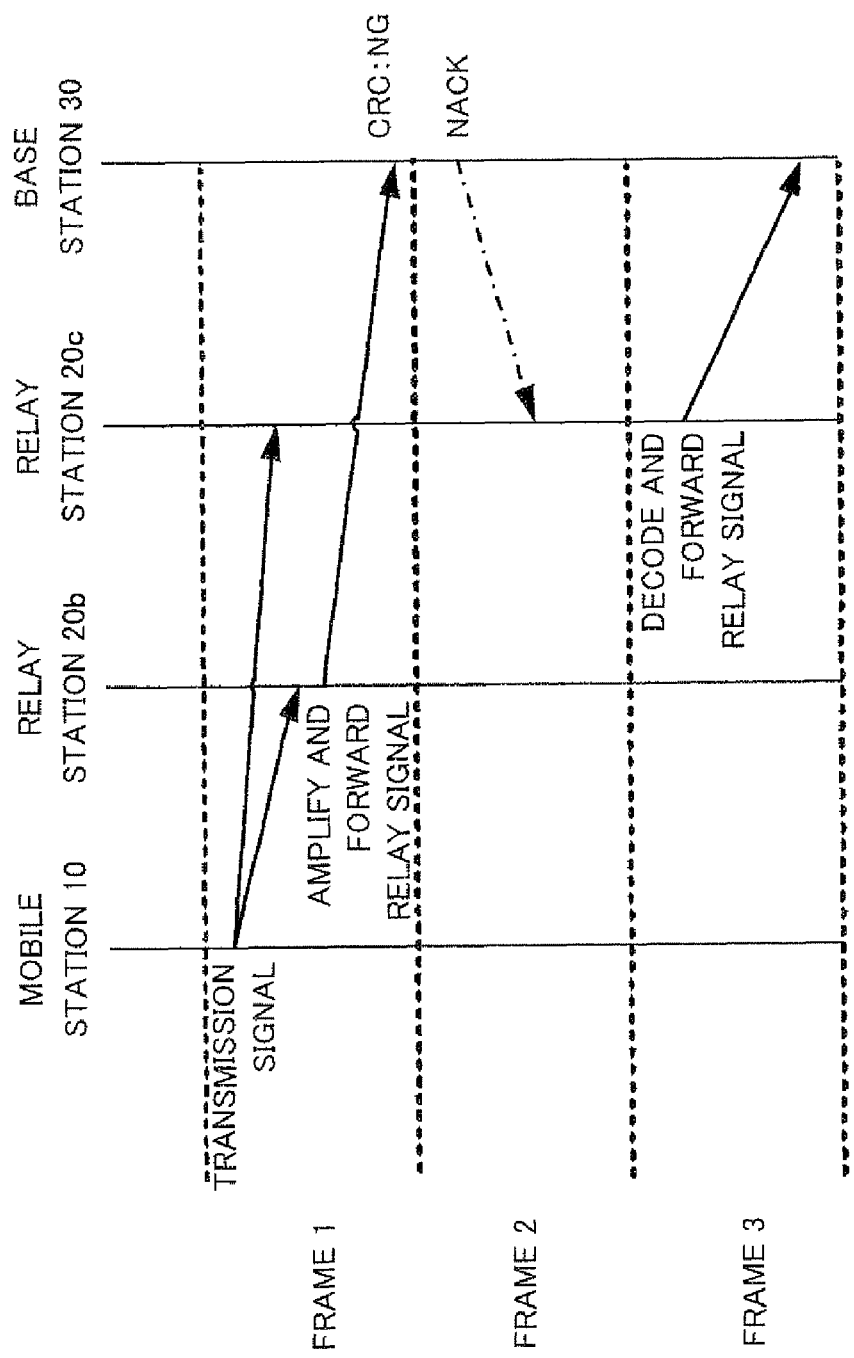
FIG. 12 illustrates an example of operation of the mobile communication system according to Embodiment 3 of the present invention.

Next, an operation example in whole mobile communication system 1a will be explained using FIG. 12.

First, in frame 1, mobile station 10 transmits a data signal (transmission signal) to relay stations. Relay station 20b transmits an amplify and forward relay signal obtained from the transmission signal to base station 30. A delay for the generation of an amplify and forward relay signal is not made by decode processing, so that the amplify and forward, relay signal is transmitted in frame 1. On the other hand, relay station 20c accumulates the decode and forward relay signal obtained from the transmission signal at the inside of relay station 20c, so that transmits no decode and forward relay signal at this point.

Base station 30 decides whether there is an error in the received amplify and forward relay signal. When an error is detected as a result of the decision and the reception quality is decided to be low, base station 30 transmits a retransmission request signal (NACK) to relay station 20c that has the function based on the decode and forward system in frame 2.

Relay station 20c that received the retransmission request signal (NACK) transmits a decode and forward relay signal obtained from the transmission signal to base station 30 in frame 3.

In this way, according to the present embodiment, an amplify and forward relay signal and a decode and forward relay signal are transmitted from different relay stations 20b and 20c, so that it is possible to realize the operations and effects similar to those in Embodiment 1, even when relay stations such as relay stations 20b and 20c that have only the function of either the amplify and forward system or the decode and forward system are used. Furthermore, when relay station 20c executes a re-relay while relay station 20b executes a first-time relay, a change occurs in channel conditions so that it is possible to improve the reception quality when received signals are combined at base station 30.

In the present embodiment, for ease of explanation, the mobile communication system providing one relay station that has the function based on the decode and forward system and one relay station that has the function based on the amplify and forward system are explained as an example. However, the number of relay stations that have their respective functions is not limited. For example, the mobile communication system may have two or more relay stations provided with the function based on the decode and forward system. In this case, base station 30 may change the destination of a retransmission request signal such that the relay station that executes a decode and forward system is changed on a per retransmission request basis.

As in the case of relay station 20 explained in Embodiment 1, relay stations 20b and 20c may also provide the functions of the decode and forward system and the amplify and forward system. In this case, relay stations 20b and 20c use different relay systems according to an instruction from, for example, mobile station 10 or base station 30.

In this embodiment, it is possible to realize the above described operations and effects on an uplink data transmission by using mobile station 10 as the radio transmitting apparatus and base station 30 as the radio receiving apparatus. Moreover, it is also possible to realize the above described operations and effects on a downlink data transmission by using base station 30 as the radio transmitting apparatus and mobile station 10 as the radio receiving apparatus.

(Embodiment 4)

Figure 13:
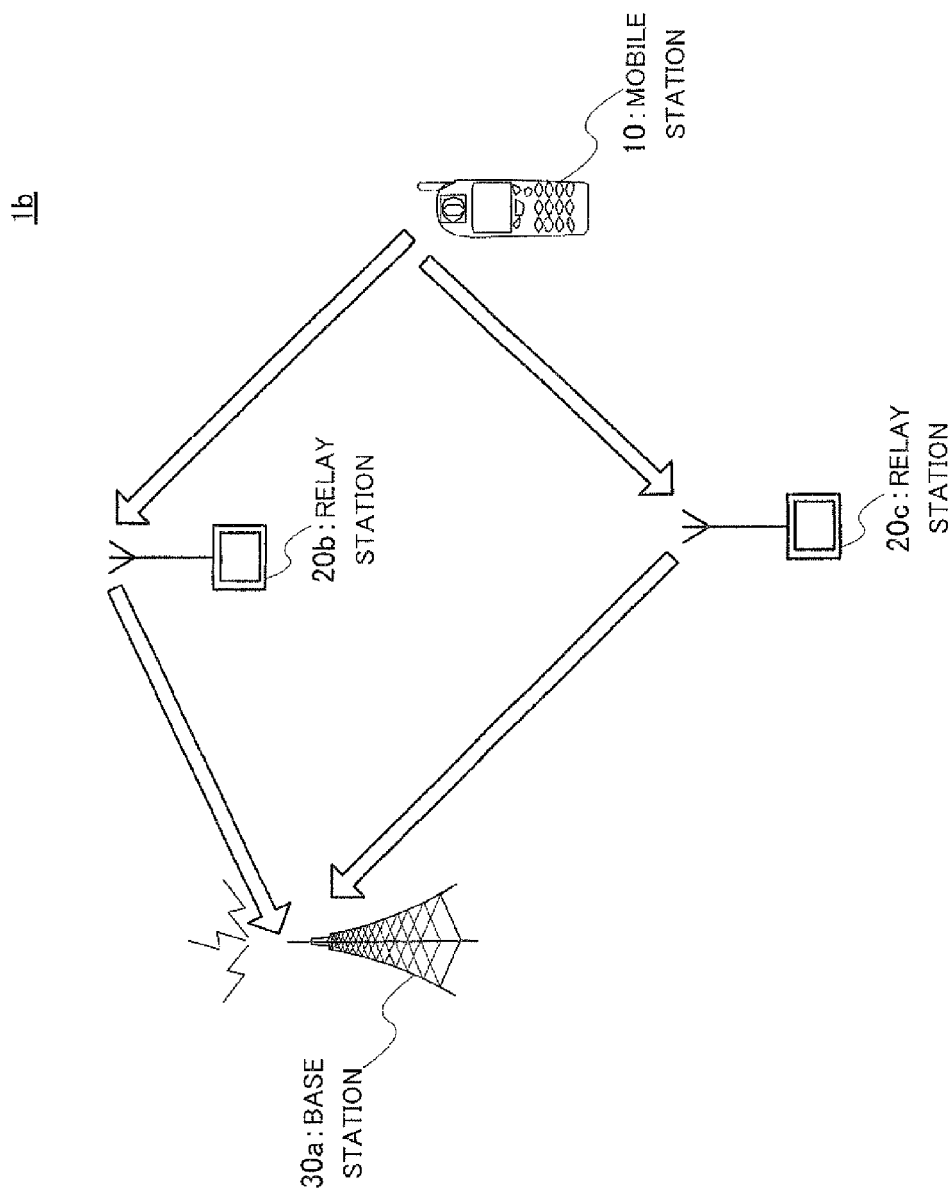
FIG. 13 shows the configuration of a mobile communication system according to Embodiment 4 of the present invention.

FIG. 13 shows the configuration of a mobile communication system according to Embodiment 4 of the present invention. Mobile communication system 1b in FIG. 13 has base station 30a in addition to mobile station 10 explained in Embodiment 1 and relay stations 20b and 20c explained in Embodiment 2.

Figure 14:
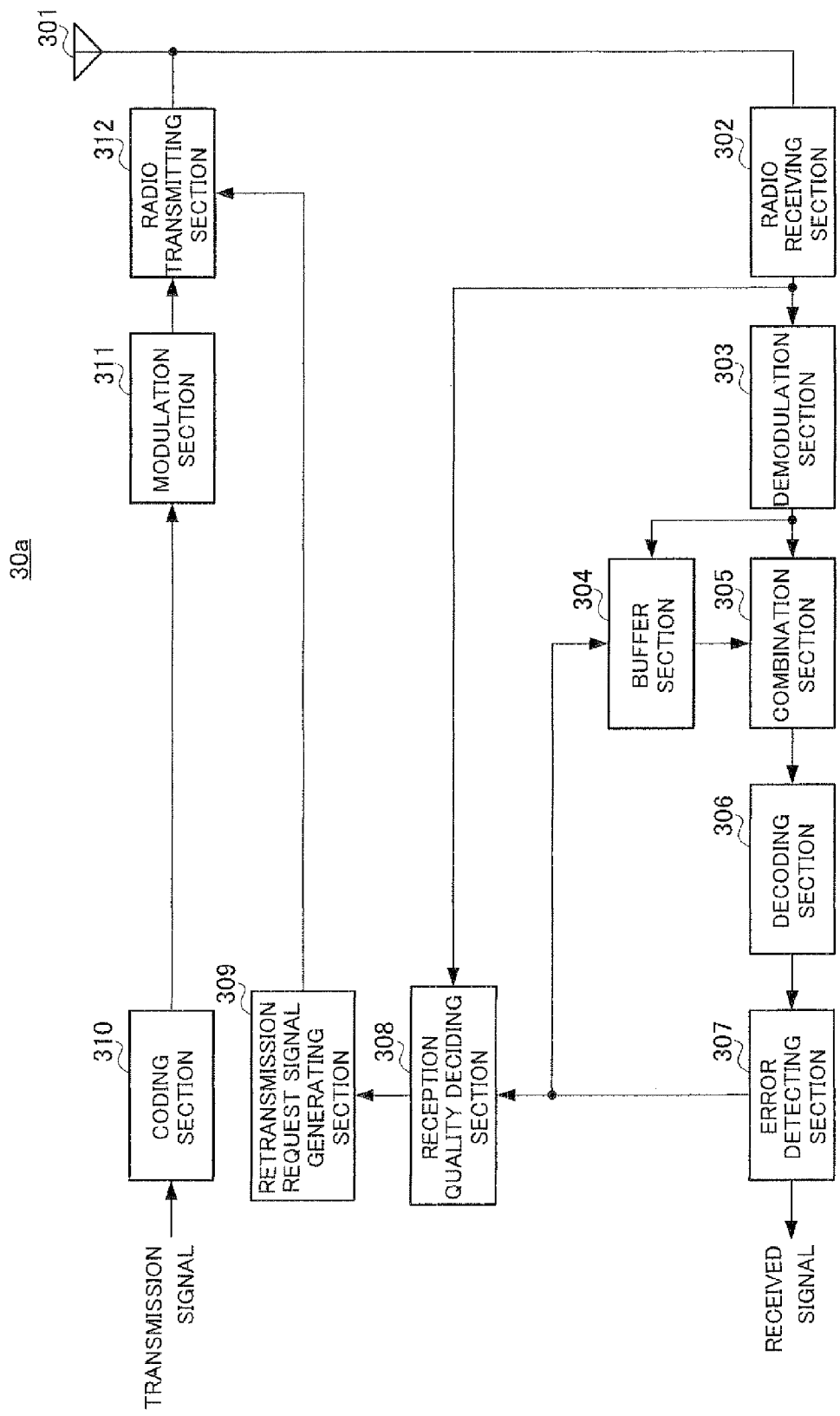
FIG. 14 is a block diagram showing the configuration of a base station apparatus according to Embodiment 4 of the present invention.

FIG. 14 is a block diagram showing the configuration of base station 30a. Base station 30a has antenna 301, radio receiving section 302, demodulation section 303, buffer section 304, combination section 305, decoding section 306, error detecting section 307, reception quality deciding section 308, retransmission request signal generating section 309, coding section 310, modulation section 311 and radio transmitting section 312.

Radio receiving section 302 receives a relay signal transmitted from relay stations 20b and 20c through antenna 301. Radio receiving section 302 applies predetermined reception radio processing (e.g., down-conversion and A/D conversion) to the relay signals received from relay station 20b and 20c. The relay signals after the reception radio processing is outputted to demodulation section 303 and reception quality deciding section 308.

Demodulation section 303 demodulates the relay signal inputted from radio receiving section 302, that is, the relay signals received from relay station 20b and 20c. The demodulated relay signal is temporarily saved in buffer section 304. Furthermore, the demodulated relay signal is outputted to combination section 305.

Buffer section 304 has "0" as an initial value. Furthermore, when a relay signal is inputted from demodulation section 303, buffer section 304 saves the relay signal.

Combination section 305 combines the relay signals inputted from demodulation section 303 with the signal saved in buffer section 304. At the first time relay, "0" is saved in buffer section 304 and the relay signal inputted from demodulation section 303 becomes the output signal of combination section 305. At the time of a re-relay, the relay signal of the preceding relay is saved in buffer section 304 and a signal combining the relay signal inputted from demodulation section 303 with the relay signal saved in buffer section 304 becomes the output signal of combination section 305.

Decoding section 306 applies error correcting coding to the relay signal outputted from combination section 305.

Error detecting section 307 applies error detection to the relay signal decoded by decoding section 306. In the present embodiment, error detecting section 307 executes error detection using CRC (Cyclic Redundancy Check). Moreover, available error detecting methods are not limited to CRC and a vertical parity check, a horizontal parity check or a Hamming code may also be used alternatively.

When an error is detected as a result of an error detection (CRC: NG), error detecting section 307 does not output the decoded relay signal as the received signal. In this case, error detecting section 307 reports the fact that an error was detected, to reception quality deciding section 308. On the other hand, when no error is detected as a result of an error detection (CRC: OK), error detecting section 307 outputs the decoded relay signal as the received signal. In this case, error detecting section 307 discards the relay signal saved in buffer section 304 and resets the value at buffer section 304 to the initial value.

Reception quality deciding section 308 decides the reception quality of the relay signal inputted from radio receiving section 302 upon receiving a report that an error was detected at error detecting section 307. More specifically, reception quality deciding section 308 reports the reception quality decision result to retransmission request signal generating section 309.

Retransmission request signal generating section 309 generates a retransmission request signal according to the reported reception quality decision result and outputs the retransmission request signal to radio transmitting section 312. More specific operations of a reception quality decision and a retransmission request signal generation will be described later Coding section 310 applies error correcting coding to a transmission signal for mobile station 10 and modulation section 311 modulates the transmission signal encoded by coding section 310. Radio transmitting section 312 applies predetermined radio transmission processing (e.g., D/A conversion and up-conversion) to the modulated transmission signal and transmits the transmission signal after the radio transmission processing from antenna 301.

Figure 15:
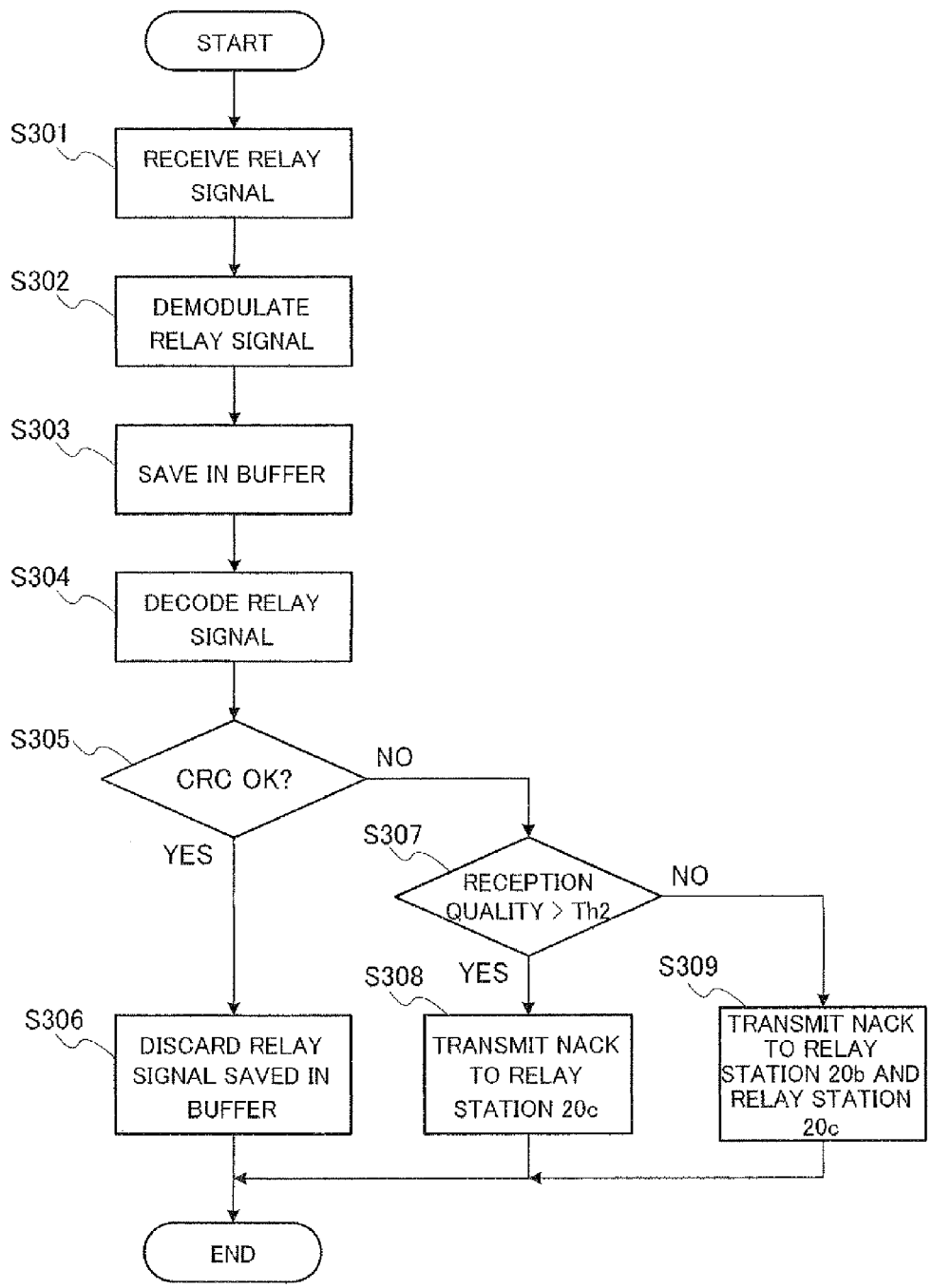
FIG. 15 is a flow chart illustrating an example of operation of the base station apparatus according to Embodiment 4 of the present invention.

Next, an operation example of base station 30a, in particular, specific examples of a reception quality decision operation and a retransmission request signal generation operation will be explained. FIG. 15 is a flow chart illustrating an operation example of base station 30a.

First, in base station 30a, radio receiving section 302 receives a relay signal (step S301). Demodulation section 303 then demodulates the received relay signal (step S302). The demodulated relay signal is combined with the signal saved in buffer section 304 at combination section 305. At that time, the demodulated relay signal is saved in buffer section 304 (step S303).

Decoding section 306 decodes the relay signal that is the output signal of combination section 305 (step S304). Error detecting section 307 applies error detection to the decoded relay signal (step S305). When no error is detected as a result of an error detection (S305: YES), the decoded relay signal is outputted as the received signal. The relay signal saved in buffer section 304 at this time is discarded and the value of buffer section 304 is reset to the initial value (step S306).

Furthermore, when an error is detected as a result of an error detection (S305: NO), reception quality deciding section 308 decides the reception quality of the relay signal inputted from radio receiving section 302 (step S307). The reception quality decision result is reported to retransmission request signal generating section 309.

Figure 16A:
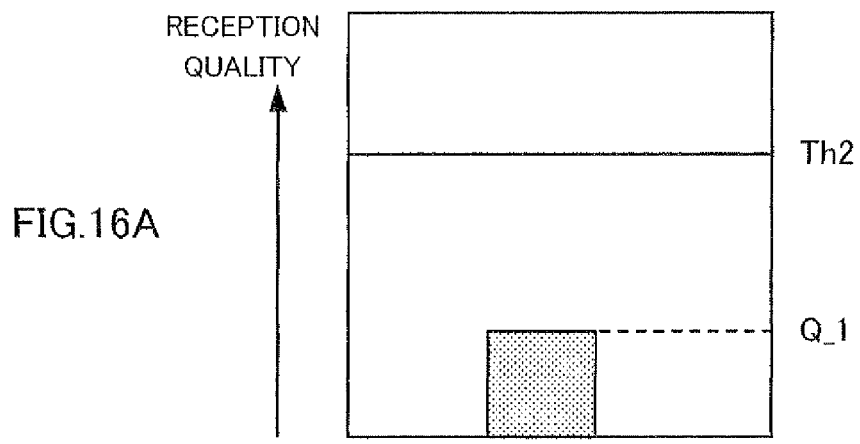
FIG. 16A shows a measured value of reception quality of a relay signal according to Embodiment 4 of the present invention.
Figure 16B:
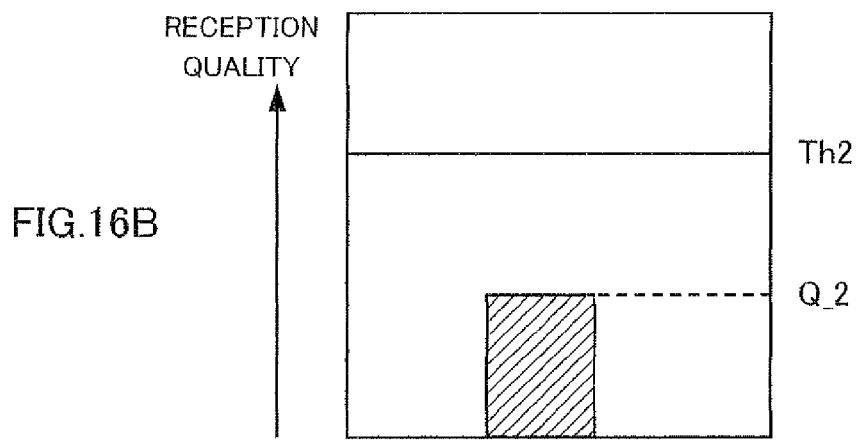
FIG. 16B shows an estimated value of reception quality of a relay signal according to Embodiment 4 of the present invention.

Here, the reception quality deciding operation in step S307 will be explained more specifically. Threshold Th2 for the essential reception quality to receive a packet (relay signal) without errors is set in reception quality deciding section 308. That is, when the reception quality of the received relay signal exceeds threshold Th2 singly or through a combination, the signal can be received correctly. FIG. 16A shows reception quality Q_1 of the relay signal received at the time of a first-time relay and received from relay station 20b. In this example, reception quality Q_1 is equal to or below threshold Th2 so that it is evident that a re-relay (retransmission) is necessary. Therefore, reception quality deciding section 308 estimates reception quality Q_2 of a relay signal received from relay station 20c (see FIG. 16B). The value of reception quality Q_2 may be preset or may be a measured value detected several packets before.

Figure 16C:
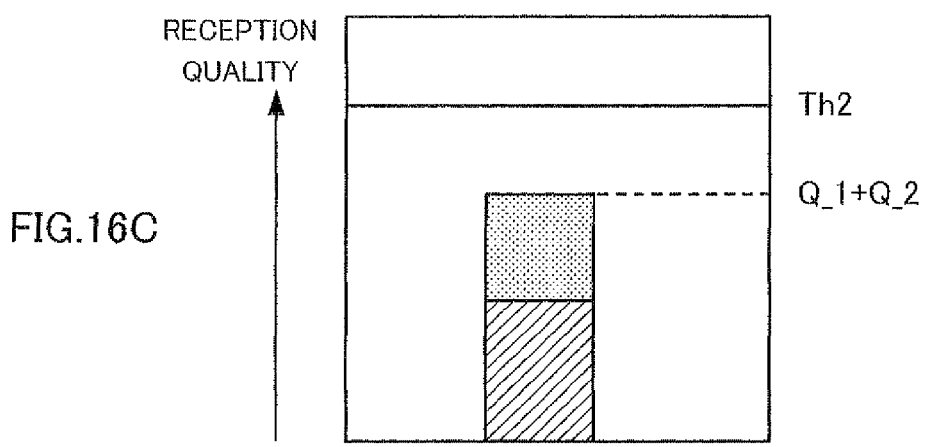
FIG. 16C shows a total value of reception quality of a relay signal according to Embodiment 4 of the present invention

Reception quality deciding section 308 sums up measured reception quality Q_1 and estimated reception quality Q_2 as shown in FIG. 16C. Reception quality deciding section 308 then compares this combined value with threshold Th2 and thereby decides whether or not there is a necessity of making not only relay station 20c but also relay station 20b execute a re-relay. When this total value exceeds threshold Th2, reception quality deciding section 308 decides that the re-relay by relay station 20b is unnecessary and determines to make only relay station 20c execute a re-relay. When this total value is equal to or below Th2, reception quality deciding section 308 decides that the re-relay by relay station 20b is necessary and determines to make relay stations 20b and 20c execute a re-relay.

The present embodiment uses the threshold compared with the total value of reception quality Q_1 and Q_2. Moreover, it is also possible to use the threshold that enables a comparison with only reception quality Q_1, to decide whether or not there is a necessity of making not only relay station 20c but also relay station 20b execute a re-relay.

After step S307, either step S308 or step S309 is executed.

When only relay station 20c is decided to execute a re-relay (S307: YES), retransmission request signal generating section 309 makes only relay station 20c execute a re-relay and generates a retransmission request signal (NACK) to execute transmission of a decode and forward relay signal. Radio transmitting section 312 transmits the generated retransmission request signal (NACK) to relay station 20c (step S308).

On the other hand, when relay stations 20b and 20c are decided to execute a re-relay (S307: NO), retransmission request signal generating section 309 makes relay stations 20b and 20c execute a re-relay and generates a retransmission request signal (NACK) to execute transmission of a decode and forward relay signal and retransmission of an amplify and forward relay signal. Radio transmitting section 312 transmits the generated retransmission request signal (NACK) to relay stations 20b and 20c (step S309).

Figure 17:
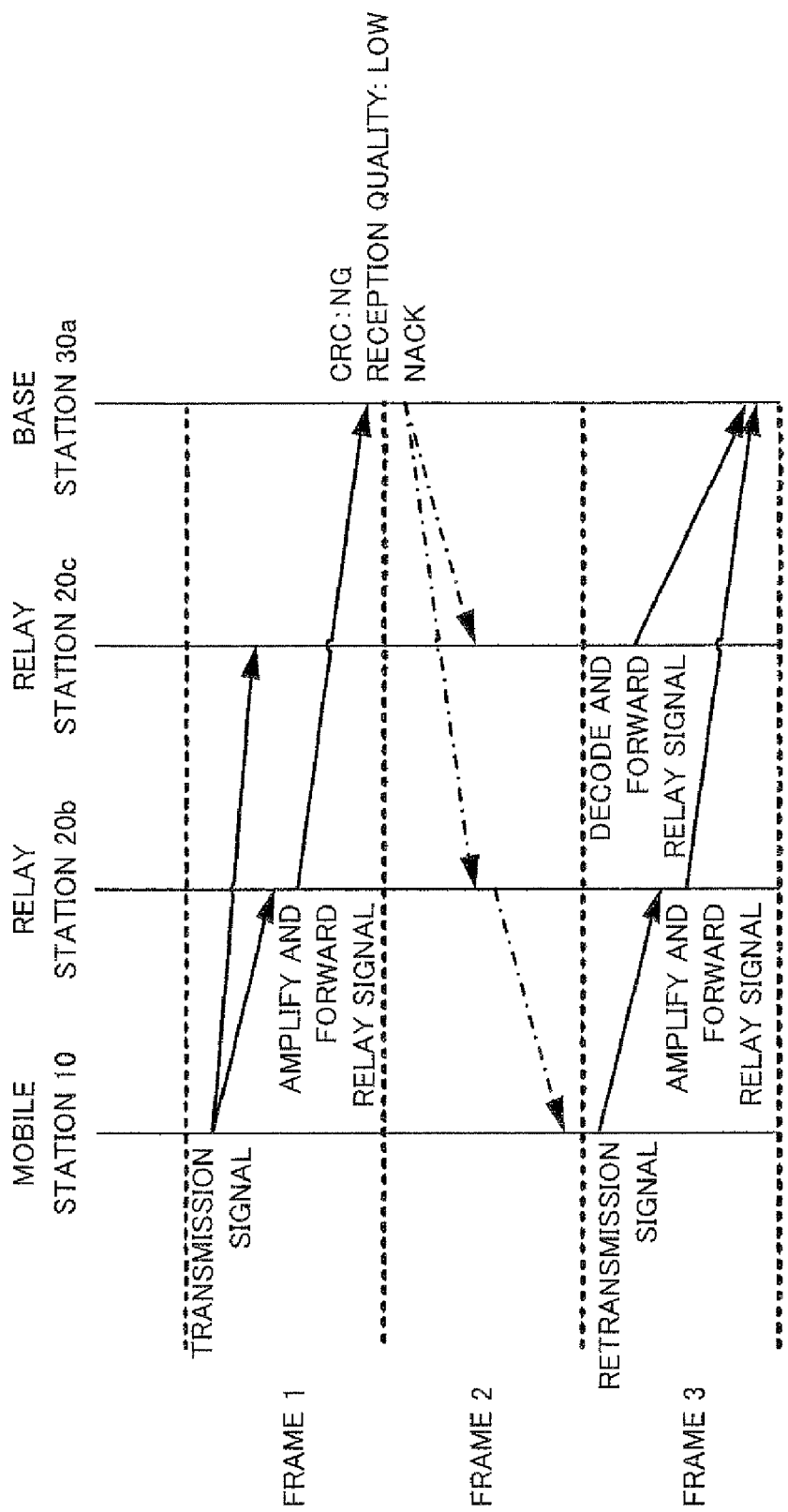
FIG. 17 illustrates an example of operation of the mobile communication system according to Embodiment 4 of the present invention.

Next, an operation example of whole mobile communication system 1b will be explained with FIG. 17.

First, in frame 1, mobile station 10 transmits a data signal (transmission signal) to relay stations 20b and 20c. Relay station 20b transmits an amplify and forward relay signal obtained from the transmission signal to base station 30a. A delay for the generation of an amplify and forward relay signal is not accompanied by the decode processing, so that the amplify and forward relay signal is transmitted in frame 1. On the other hand, relay station 20c accumulates a decode and forward relay signal obtained from the transmission signal inside relay station 20c, so that relay station 20c does not transmit any decode and forward relay signal at this time point.

Base station 30a decides whether there is an error in the received amplify and forward relay signal. When an error is detected and the reception quality is decided to be low (e.g., equal to or below threshold Th2) as a result of the decision, base station 30a transmits, in frame 2, a retransmission request signal (NACK) to not only relay station 20e having the function based on the decode and forward system but also relay station 20b having the function based on the amplify and forward system.

Relay station 20b that received the retransmission request signal (NACK) needs to receive the data signal again from mobile station 10 to execute the retransmission of an amplify and forward relay signal, and relay station 20b transfers the received retransmission request signal (NACK) to mobile station 10 in frame 2.

In response to the retransmission request signal (NACK) received from base station 30a, relay station 20c transmits the decode and forward relay signal to base station 30a in frame 3. Furthermore, mobile station 10 transmits the data signal (retransmission signal) to relay station 20b in frame 3 in response to the retransmission request signal (NACK) received from relay station 20b. Relay station 20b transmits the amplify and forward relay signal obtained from the retransmission signal to base station 30a in frame 3. Therefore, base station 30a can receive the amplify and forward relay signal retransmitted from relay station 20b and the decode and forward relay signal transmitted from relay station 20c at the same time and combine these signals.

In this way, according to the present embodiment, whether or not there is a necessity of a retransmission of an amplify and forward relay signal executed with a transmission of a decode and forward relay signal is decided. A retransmission request that causes a transmission of the decode and forward relay signal and a retransmission of the amplify and forward relay signal to be executed is transmitted when a retransmission of the amplify and forward relay signal is decided to be necessary, and a retransmission request that causes only a transmission of the decode and forward relay signal to be executed is transmitted when a retransmission of the amplify and forward relay signal is decided to be unnecessary, so that it is possible to realize a diversity effect during a re-relay. Furthermore, when the relay signal is predicted to be received without error even if the diversity effect is not realized at the time of a re-relay, it is possible to execute control such that no diversity transmission is carried out.

For ease of explanation, the present embodiment explained the mobile communication system providing one relay station having the function based on the decode and forward system and one relay station having the function based on the amplify and forward system as an example. In this case, the number of relay stations having the above functions is not limited. The mobile communication system may have, for example, two or more relay stations proving the functions based on the decode and forward system. In this case, the relay station that executes an amplify and forward system or a decode and forward system is always selected when a retransmission is requested, such that base station 30a may change the destination of a retransmission request signal.

In the present embodiment, it is possible to realize the above described operations and effects on an uplink data transmission by using mobile station 10 as the radio transmitting apparatus and base station 30 as the radio receiving apparatus. Moreover, it is also possible to realize the above described operations and effects on a downlink data transmission by using base station 30 as the radio transmitting apparatus and mobile station 10 as the radio receiving apparatus.

According to the present embodiment, although relay station 20b transmits the amplify and forward relay signal obtained from a signal retransmitted from mobile station 10 upon executing a retransmission of an amplify and forward relay signal, it is also possible to retransmit an amplify and forward relay signal obtained from a signal transmitted from mobile station 10 for the first time.

Moreover, in the present embodiment, retransmission request signal generating section 309 generates a retransmission request signal according to the reported reception quality decision result. Furthermore, when an error is detected as a result of error detection, retransmission request signal generating section 309 may also generate a retransmission request signal (NACK) to causes a transmission of a decode and forward relay signal and a retransmission of an amplify and forward relay signal to be executed regardless of the reception quality decision result.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSFs, and implementation using dedicated circuitry or general purpose processors is also possible After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2005-045974 filed on Feb. 22, 2005, entire content of which is expressly incorporated by reference herein.

Industrial Applicability

The radio communication method, relay station apparatus and radio receiving apparatus of the present invention can be applied to, for example, a base station apparatus and a mobile station apparatus, or a relay station apparatus used in a radio communication system that relays a transmission signal.

The invention claimed is:

1. A communication method used in a communication system having a transmission apparatus, a relay station apparatus and a reception apparatus, the method comprising:
   a transmission step of transmitting a transmission signal from the transmission apparatus to the relay station apparatus;
   a first relay step of transmitting an amplify and forward relay signal obtained from the transmission signal transmitted in the transmission step, from the relay station apparatus to the reception apparatus;
   a requesting step of transmitting a retransmission request of the transmission signal from the reception apparatus based on a reception result of the amplify and forward relay signal transmitted in the first relay step at the reception apparatus; and
   a second relay step of transmitting a decode and forward relay signal obtained from the transmission signal transmitted in the transmission step from the relay station apparatus to the reception apparatus when the retransmission request is transmitted in the requesting step.

2. The communication method according to claim 1, further comprising a measuring step of measuring reception quality of the transmission signal transmitted in the transmission step at the relay station apparatus,
   wherein, in the first relay step, the amplify and forward relay signal is transmitted when the reception quality is higher than a predetermined level and the decode and forward relay signal is transmitted when the reception quality is equal to or lower than the predetermined level.

3. The communication method according to claim 2, further comprising an error detection step of executing error detection on the transmission signal transmitted in the transmission step,
   wherein, in the first relay step, the decode and forward relay signal is transmitted when the reception quality is equal to or lower than the predetermined level and no error is detected in the error detection step, and neither the amplify and forward relay signal nor the decode and forward relay signal is transmitted when the reception quality is equal to or lower than the predetermined level and an error is detected in the error detection step.

4. The communication method according to claim 1, wherein:
   the relay station apparatus comprises a first relay station apparatus and a second relay station apparatus;
   in the first relay step, the amplify and forward relay signal is transmitted from the first relay station apparatus; and
   in the second relay step, the decode and forward relay signal is transmitted from the second relay station apparatus.

5. The communication method according to claim 4, further comprising a third relay step of transmitting the decode and forward relay signal from the second relay station apparatus in the second relay step and retransmitting the amplify and forward relay signal from the first relay station apparatus to the reception apparatus.

6. The communication method according to claim 5, further comprising:
   a transfer step of transferring a retransmission request transmitted in the requesting step to the transmission apparatus; and
   a retransmission step of retransmitting the transmission signal from the transmission apparatus to the first relay station apparatus according to the retransmission request transferred in the transfer step,
   wherein, in the third relay step, the amplify and forward relay signal obtained from the transmission signal in the retransmission step is transmitted.

7. The communication method according to claim 5, further comprising a decision step of deciding whether or not there is a necessity of executing the third relay step based on the reception result of the amplify and forward relay signal transmitted in the first relay step at the reception apparatus,
   wherein, in the requesting step, a first retransmission request causing an execution of the second relay step and the third relay step is transmitted when an execution of the third relay step is decided to be necessary, and a second retransmission request causing an execution of only the second relay step is transmitted when an execution of the third relay step is decided to be unnecessary.

8. A relay station apparatus that relays a signal transmitted from a transmission apparatus to a reception apparatus, the relay station apparatus comprising:
- a reception section that receives the signal for the reception apparatus transmitted from the transmission apparatus;
- a generating section that generates an amplify and forward relay signal and a decode and forward relay signal from the received signal for the reception apparatus; and
- a transmission section that transmits the amplify and forward relay signal upon relaying the signal for the reception apparatus in a first relay time, and that transmits the decode and forward relay signal upon re-relaying the signal for the reception apparatus when a retransmission request is received from the reception apparatus in a second relay time.

9. The relay station apparatus according to claim 8, further comprising a measuring section that measures reception quality of the received signal for the reception apparatus,
- wherein, in the first relay time, when the reception quality is higher than a predetermined level, the amplify and forward relay signal is transmitted, and when the reception quality is equal to or lower than the predetermined level, the decode and forward relay signal is transmitted.

10. The relay station apparatus according to claim 9, further comprising an error detecting section that executes an error detection on the received signal for the reception apparatus,
- wherein, in the first relay time, when the reception quality is equal to or lower than the predetermined level and no error is detected by the error detecting section, the decode and forward relay signal is transmitted, and when the reception quality is equal to or lower than the predetermined level and the error is detected by an error detecting section, neither the amplify and forward relay signal nor the decode and forward relay signal is transmitted.

11. A relay method performed by a relay station apparatus that relays a signal transmitted from a transmission apparatus to a reception apparatus, the relay method comprising:
- receiving the signal for the reception apparatus transmitted from the transmission apparatus;
- generating an amplify and forward relay signal and a decode and forward relay signal from the received signal for the reception apparatus; and
- transmitting the amplify and forward relay signal upon relaying the signal for the reception apparatus in a first relay time, and transmitting the decode and forward relay signal upon re-relaying the signal for the reception apparatus when a retransmission request is received from the reception apparatus in a second relay time.

* * * * *